(12) United States Patent
Klappert et al.

(10) Patent No.: US 10,838,606 B2
(45) Date of Patent: Nov. 17, 2020

(54) METHODS AND SYSTEMS FOR PERFORMING DYNAMIC SEARCHES USING A MEDIA GUIDANCE APPLICATION

(71) Applicant: Rovi Guides, Inc., San Jose, CA (US)

(72) Inventors: Walter R. Klappert, Los Angeles, CA (US); Camron Shimy, Canyon Country, CA (US)

(73) Assignee: Rovi Guides, Inc., San Jose, CA (US)

( * ) Notice: Subject to any disclaimer, the term of this patent is extended or adjusted under 35 U.S.C. 154(b) by 810 days.

(21) Appl. No.: 14/230,504

(22) Filed: Mar. 31, 2014

(65) Prior Publication Data

US 2015/0278205 A1 Oct. 1, 2015

(51) Int. Cl.

| | | |
|---|---|---|
| *H04N 21/462* | (2011.01) | |
| *G06F 3/0485* | (2013.01) | |
| *H04N 21/442* | (2011.01) | |
| *H04N 21/45* | (2011.01) | |
| *G06F 3/0482* | (2013.01) | |
| *H04N 21/482* | (2011.01) | |

(52) U.S. Cl.
CPC .......... *G06F 3/0485* (2013.01); *G06F 3/0482* (2013.01); *H04N 21/44222* (2013.01); *H04N 21/4532* (2013.01); *H04N 21/4622* (2013.01); *H04N 21/4828* (2013.01)

(58) Field of Classification Search
CPC ............. H04N 7/17318; H04N 21/482; H04N 21/4821; H04N 21/25; H04N 21/4312; H04N 21/42204; H04N 5/44543; H04N 21/472; H04N 21/431; H04N 21/462; H04N 2005/44556; G06F 3/048; G06F 3/0482; G06F 3/0488
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 7,823,076 B2* | 10/2010 | Borovsky | G06F 3/04883 715/762 |
| 8,046,801 B2 | 10/2011 | Ellis et al. | |
| 8,502,804 B2* | 8/2013 | Kolmykov-Zotov | G06F 3/04842 345/179 |
| 8,533,599 B2* | 9/2013 | Son | G06F 1/1616 715/716 |
| 8,533,760 B1* | 9/2013 | Lakin | H04N 21/4384 348/38 |
| 8,607,268 B2* | 12/2013 | Migos | H04N 5/44543 348/734 |

(Continued)

*Primary Examiner* — Yassin Alata
(74) *Attorney, Agent, or Firm* — Haley Guiliano LLP

(57) ABSTRACT

Methods and systems are discussed herein for improving the efficiency and ease of navigating and selecting media content without the need for additional keys, buttons, or other inputs. For example, in response to the same user input, the media guidance application may determine different numbers of content sources to skip, in a dynamic fashion, based on the total number of content sources, the order of the content sources, the direction a user wishes to navigate, and/or prior user inputs related to navigating the content sources.

20 Claims, 6 Drawing Sheets

(56) References Cited

U.S. PATENT DOCUMENTS

| | | | |
|---|---|---|---|
| 8,640,166 B1* | 1/2014 | Craner | H04N 21/4826 725/37 |
| 8,799,954 B1 | 8/2014 | Ellis | |
| 8,874,370 B1* | 10/2014 | Harris | G06F 3/04817 701/428 |
| 2002/0069409 A1* | 6/2002 | Storz | H04N 5/44543 725/37 |
| 2002/0113895 A1* | 8/2002 | Takagi | H04N 5/50 348/569 |
| 2002/0174430 A1 | 11/2002 | Ellis et al. | |
| 2003/0110499 A1 | 6/2003 | Knudson et al. | |
| 2003/0229900 A1* | 12/2003 | Reisman | G06F 17/30873 725/87 |
| 2005/0251827 A1 | 11/2005 | Ellis et al. | |
| 2005/0265160 A1* | 12/2005 | Sasaki | G11B 27/34 369/47.1 |
| 2006/0132435 A1* | 6/2006 | Machida | G06F 3/0317 345/157 |
| 2008/0079972 A1* | 4/2008 | Goodwin | G06F 3/0485 358/1.12 |
| 2010/0153885 A1 | 6/2010 | Yates | |
| 2011/0083148 A1* | 4/2011 | Sakaguchi | H04N 5/44543 725/39 |
| 2012/0242581 A1* | 9/2012 | Laubach | G06F 3/04812 345/168 |
| 2012/0317046 A1 | 12/2012 | Myslinski | |
| 2012/0317602 A1* | 12/2012 | Pettit | H04N 21/4821 725/45 |
| 2014/0189736 A1* | 7/2014 | Kummer | H04N 21/4263 725/39 |
| 2015/0033258 A1 | 1/2015 | Klappert et al. | |
| 2015/0128183 A1* | 5/2015 | Hyeon | H04N 21/4383 725/46 |
| 2016/0227291 A1* | 8/2016 | Shaw | H04N 21/251 |

\* cited by examiner

METHODS AND SYSTEMS FOR PERFORMING DYNAMIC SEARCHES USING A MEDIA GUIDANCE APPLICATION

BACKGROUND

Today, users are accessing media content on devices upon which they traditionally did not. For example, users may now access media content that was previously restricted to display on a television on a plurality of mobile devices (e.g., smartphones, tablets, etc.). Despite their ability to present media content of various types, navigating and selecting media content on many of these devices is often limited by smaller user input interfaces. For example, in order to access a television channel on a traditional remote control, a user may use various short cuts (e.g., inputting a channel number to jump directly to the television channel). Unfortunately, user input interfaces on many newer devices (e.g., smartphones) do not feature, or have the room to feature, alphanumeric keypads and/or the plurality of other specialized inputs that allow a user to easily navigate menus or content sources associated with available media content.

SUMMARY

Accordingly, methods and systems are discussed herein for improving the efficiency and ease of navigating and selecting media content without the need for additional keys, buttons, or other inputs. Specifically, by performing different operations in response to a user selection of the same input, a media guidance application can increase the speed at which users may scroll over media content that they do not wish to consume. For example, in response to the same user input, the media guidance application may determine different numbers of content sources to skip, in either a binary or dynamic fashion, based on the total number of content sources, the order of the content sources, the direction a user wishes to navigate, and/or prior user inputs related to navigating the content sources.

In some aspects, a media guidance application may navigate to a first content source of consecutively ordered content sources in response to a first user request. For example, in response to a user turning on a television, accessing a media guide menu, changing a channel, etc., the media guidance application may present media content or highlight a media listing associated with a particular television channel or content provider. The media guidance application may then receive a second user request to navigate away from the first content source in a first direction. For example, the user request may correspond to a "channel up" command while surfing television channels or a directional arrow "up" command while scrolling a menu.

In response to receiving the second user request, the media guidance application may determine a second content source of the consecutively ordered content sources to navigate to based on a number of the consecutively ordered content sources between the first content source and a last content source of the consecutively ordered content sources in the first direction. For example, the media guidance application may determine a content source that corresponds to a median in the consecutively ordered list between the first content source and the last content source. For example, if the first content source is associated with television channel number one, and the last content source is associated with television channel number nine, the media guidance application may select a content source associated with television channel number five.

The media guidance application may then navigate to the second content source. For example, in response to a "channel up" command, the media guidance application may navigate to a television channel that is associated with a higher channel number than a current television channel. In another example, in response to a directional arrow "up" command, the media guidance application may navigate to a menu option on a menu page that is associated with a position in a list of menu options above a current menu option.

In some embodiments, the media guidance application may select a second content source based on the direction associated with the second user request. For example, in some embodiments, the media guidance application may receive a third user request to navigate away from the second content source in the first direction. In response to receiving the third user request, the media guidance application may determine a third content source of the consecutively ordered content sources to navigate to based on a number of the consecutively ordered content sources between the second content source and the last content source in the first direction. For example, if the first content source is associated with television channel number one, and the last content source is associated with television channel number nine, the media guidance application may select a second content source associated with television channel number five in response to the first user request with a positive direction. Furthermore, if the second user request is also positive (e.g., relates to increasing the channel number), the media guidance application may select a third content source associated with television channel number seven in response to the second user request.

In contrast, in response to receiving a third user request to navigate away from the second content source in a second direction, the media guidance application may determine a third content source of the consecutively ordered content sources to navigate to based on a number of the consecutively ordered content sources between the first content source and the second content source in the second direction. For example, if the first content source is associated with television channel number one, and the last content source is associated with television channel number nine, the media guidance application may select a second content source associated with television channel number five in response to the first user request with a positive direction. However, if the second user request is negative (e.g., relates to decreasing the channel number), the media guidance application may select a third content source associated with television channel number three in response to the second user request.

In some embodiments, the media guidance application may receive a plurality of user requests. Furthermore, each subsequent user request may result in the media guidance application skipping fewer content sources than a previous user request when selecting a content source. For example, the number of content sources between the first content source and the last media may be greater than the number of content sources between the second content source and the last content source.

In some embodiments, the media guidance application may continue to reduce the number of content sources that are skipped until there are no additional content sources to skip in a particular direction. For example, the media guidance application may determine whether the number of the consecutively ordered content sources between the first content source and the last content source of the consecutively ordered content sources in the first direction corresponds to one. In response to determining that the number of the consecutively ordered content sources between the first content source and the last content source of the consecutively ordered content sources in the first direction corresponds to one, the media guidance application may select a content source adjacent to the first content source in the consecutively ordered content sources in the first direction as the second content source.

In some aspects, the media guidance application may navigate to a first content source of consecutively ordered content sources in response to a first user request. For example, in response to a user turning on a television, accessing a media guide menu, changing a channel, etc., the media guidance application may present media content or highlight a media listing associated with a particular television channel or content provider. The media guidance application may then receive a second user request to navigate away from the first content source. For example, the user request may correspond to a request to change a television channel.

The media guidance application then determines whether a direction associated with the first user request corresponds to a direction associated with the second user request. For example, in some embodiments, the direction associated with the first user request may correspond to either ascending through the consecutively ordered content sources or descending through the consecutively ordered content sources. For example, if the first user request corresponds to a "channel up" command while surfing television channels or a directional arrow "up" command while scrolling a menu, the media guidance application determines if the second user request also corresponds to "up" (as opposed to "down").

In response to determining that the direction associated with the first user request corresponds to the direction associated with the second user request, the media guidance application may determine a number of the consecutively ordered content sources to skip when navigating away from the first content source based on a number of the consecutively ordered content sources that were skipped when navigating to the first content source. For example, if the media guidance application determines that the user has requested two "channel up" commands in a row, the media guidance application may skip more channels in response to the second user request than were skipped in response to the first user request.

In some embodiments, when determining the number of the consecutively ordered content sources to skip when navigating away from the first content source based on the number of the consecutively ordered content sources that were skipped when navigating to the first content source, the media guidance application may further determine the number of the consecutively ordered content sources that were skipped when navigating to the first content source. The media guidance application may then increase the number of the consecutively ordered content sources that were skipped when navigating to the first content source by one. For example, in response to determining that zero content sources were skipped in response to the first user request, the media guidance application may determine to skip one content source in response to the second user request.

In some embodiments, when determining the number of the consecutively ordered content sources when navigating away from the first content source based on the number of the consecutively ordered content sources that were skipped when navigating to the first content source, the media guidance application may determine the number of the consecutively ordered content sources that were skipped when navigating to the first content source. The media guidance application may then increase the number of the consecutively ordered content sources that were skipped when navigating to the first content source by a factor of two. For example, in response to determining that two content sources were skipped in response to the first user request, the media guidance application may determine to skip four content sources in response to the second user request.

In some embodiments, in response to determining that the direction associated with the first user request does not correspond to the direction associated with the second user request, the media guidance application may skip a default number of the consecutively ordered content sources when navigating away from the first content source. For example, while the media guidance application increases the number of content sources skipped during each subsequent user request associated with the same direction, the media guidance application may reset to skipping a default number or content sources (e.g., zero) in response to receiving a user request associated with an opposite direction.

In some embodiments, the media guidance application may set one or more conditions as to whether or not the number of the consecutively ordered content sources that were skipped when navigating to the first content source affects the number of the consecutively ordered content sources to skip when navigating away from the first content source. For example, in order to better predict the wishes of a user, the media guidance application may compare a user request to temporal or numerical thresholds.

For example, the media guidance application may determine whether the second user request was received within a predetermined amount of time from a first user request. In response to determining that the second user request was not received within the predetermined time of the first user request, the media guidance application may skip only a default number of the consecutively ordered content sources when navigating away from the first content source. For example, if a large amount of time has lapses between the receipt of the first and second user request, a user may not wish for the number of the consecutively ordered content sources that were skipped when navigating to the first content source to affect the number of the consecutively ordered content sources to skip when navigating away from the first content source.

In another example, the media guidance application may determine whether a threshold number of requests was received prior to the second user request. In response to determining that the threshold number of requests was not received prior to the second user request, the media guidance application may only skip a default number of the consecutively ordered content sources when navigating away from the first content source. For example, if a user needs to only scroll a few channels (e.g., corresponding to a few user requests), a user may not wish for the media guidance application to dynamically adjust the number of the consecutively ordered content sources that are skipped. Thus, the media guidance application may first wait until a threshold number (e.g., five) of user requests are received in series before dynamically adjusting the number of the consecutively ordered content sources that are skipped.

In yet another example, the media guidance application may apply multiple conditions. For example, the media guidance application may determine whether a threshold number of requests was received prior to the second user request within a predetermined time, whether all the user requests meeting the threshold number of requests (or within the predetermined amount of time) all correspond to the same direction, etc.

By skipping over and selecting content sources in the binary and/or dynamic fashions above, a user may quickly scroll through numerous content sources. Moreover, despite the fact that navigating to the first content source or the second source may result in skipping over different numbers of content sources, the media guidance application may receive both the first and second user requests via the same on-screen option, button, or command. Limiting the number of different user input types, without limiting the functions of the media guidance application is of particular use in cases where a user device may have difficulty distinguishing multiple user input types (e.g., in cases where user requests are triggered by monitoring brain activity of a user, motions of the user, and/or other biometric data of the user).

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
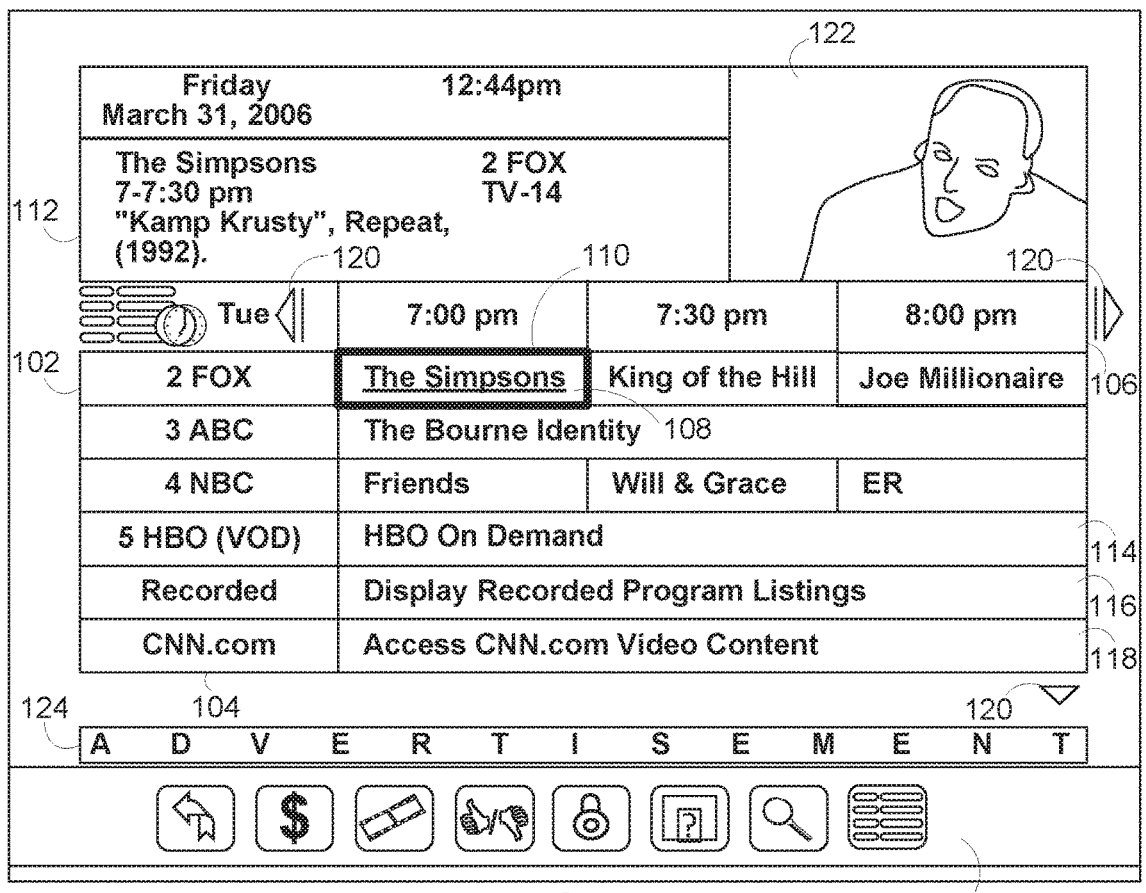
FIG. 1 shows an illustrative example of a media guidance application in accordance with some embodiments of the disclosure.

Methods and systems are discussed herein for improving the efficiency and ease of navigating and selecting media content without the need for additional keys, buttons, or other inputs. Specifically, by performing different operations in response to a user selection of the same input, a media guidance application can increase the speed at which users may scroll over media content that they do not wish to consume. For example, in response to the same user input, the media guidance application may determine different numbers of content sources (e.g., television channels, internet radio stations, streaming video providers, etc.) to skip, in either a binary (e.g., through the use on two different types of inputs) or dynamic (i.e., not static) fashion, based on the total number of content sources, the order of the content sources, the direction a user wishes to navigate, and/or prior user inputs related to navigating the content sources.

As referred to herein, a "media guidance application," "interactive media guidance application," or simply "guidance application" is a form of media guidance through an interface that allows users to efficiently navigate content selections and easily identify content that they may desire. The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media cards, register memory, processor caches, Random Access Memory ("RAM"), etc.

Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

Media assets or content may be provided by a plurality of content sources. As referred to herein, "a content source" is any entity (e.g., a person, company, account, location, device, media channel or station, etc.) that provides media assets or content. In some embodiments, a media guidance application may organize a plurality of content sources into a list or other collection. For example, a media guidance application may list all television channels, internet radio stations, streaming video providers, etc. available (e.g., based on a subscription status, geographical location, content control feature, and/or any other criteria) to a user. Moreover, in some embodiments, the plurality of content sources may be consecutively ordered. It should be noted that throughout this disclosure embodiments that allow a user to skip to different content sources may also be used to skip through media assets or categories of media assets (e.g., genre).

As used herein, "consecutively ordered" content sources refer to a plurality of content sources arranged in relation to each other according to a particular sequence, pattern, or method. In some embodiments, the particular sequence, pattern, or method may be apparent to a user of the media guidance application. For example, the plurality of content sources may be ordered in a list, may be associated with alphanumeric indicators (e.g., numbers, letters, graphics, audio cues, or other objects) that denote an order, may be scrolled and/or navigated through in a particular order, etc. In some embodiments, the particular sequence, pattern, or method may not be apparent to a user of the media guidance application. For example, although the plurality of content sources are associated with a particular order, the plurality of content sources may be not be displayed in a list, alphanumeric indicators may be contained in data (e.g., metadata) not viewable by a user, etc.

In some embodiments, consecutively ordered content sources may be ordered, or content sources may be include/excluded from the ordering, according to user criteria or user preferences. For example, a user may request a list or access to, or a media guidance application may present the list or provide access to, all content sources meeting, or only content sources that meet, one or more criteria (e.g., genre, broadcast time, etc.). The media guidance application may then allow a user to navigate and select media content provided by the content sources.

In some embodiments, a media guidance application may navigate to a first content source of consecutively ordered content sources in response to a first user request. It should be noted that a user request as discussed herein may include user requests inputted manually by a user or requests that are automatically applied by the media guidance application. For example, in some embodiments, the media guidance application may receive each user input via a manual input entered via a user input interface. Alternatively or additionally, the media guidance application may perform requests even if each request is not manually entered by a user. For example, the media guidance application may invoke an automatic scan, in which content sources are navigated to according to a predetermined schedule of requests.

It should be noted that requests to navigate to or away from a content source may include requests for media guidance application operations that, while performing other functions, result in a content source being navigated to or away from. As referred to herein, a "media guidance application operation" refers to any operation corresponding to providing, receiving, and generating media guidance data for consumption by a user. For example, media guidance application operations include displaying media guidance data, providing options to navigate, select, and edit media guidance data or content (e.g., a media asset) associated with media guidance data, and/or manipulating a device used to access (e.g., a display device), retrieve (e.g., a server), and/or associate media guidance data with a user (e.g., a user device for monitoring brain activity). One of the operations of the media guidance application is to provide media guidance data to users.

For example, in response to a user turning on a television, accessing a media guide menu, selecting a "favorites" option, opening a home page, the media guidance application may present media content or highlight a media listing associated with a particular television channel or content provider even though a user did not necessarily request that the media guidance application perform that function.

The media guidance application may then receive one or more additional user requests that result in the media guidance application navigating away from a current content source. In some embodiments, a user request navigating away from a content source is associated with a direction. As used herein, "a direction" refers to a course through the consecutively order content sources. For example, the user request may correspond to a "channel up" command while surfing television channels or a directional arrow "up" command while scrolling a menu. In each case, the direction associated with the user request is up. In contrast, the user request may correspond to a "channel down" command while surfing television channels or a directional arrow "down" command while scrolling a menu. In each case, the direction associated with the user request is down.

In some embodiments, a direction associated with a user request may correspond to either ascending through the consecutively ordered content sources or descending through the consecutively ordered content sources. It should be noted that the direction may define any criteria for progressing through the content sources (e.g., left to right, in to out, back to forward, biggest to smallest, etc.) that is consistent with the sequence, pattern, or method used to arrange the content sources. It should further be noted that in some embodiments, the media guidance application may progress through the content sources one at a time. However, the content sources may also be arranged into subsets or other categories through which a user may progress.

In some embodiments, the media guidance application may select a second content source based on the direction associated with the second user request. For example, in some embodiments, the media guidance application may receive a third user request to navigate away from the second content source in the first direction. In response to receiving the third user request, the media guidance application may determine a third content source of the consecutively ordered content sources to navigate to based on a number of the consecutively ordered content sources between the second content source and the last content source in the first direction. For example, if the first content source is associated with television channel number one, and the last content source is associated with television channel number nine, the media guidance application may select a second content source associated with television channel number five in response to the first user request with a positive direction. Furthermore, if the second user request is also positive (e.g., relates to increasing the channel number), the media guidance application may select a third content source associated with television channel number seven in response to the second user request.

In contrast, in response to receiving a third user request to navigate away from the second content source in a second direction, the media guidance application may determine a third content source of the consecutively ordered content sources to navigate to based on a number of the consecutively ordered content sources between the first content source and the second content source in the second direction. For example, if the first content source is associated with television channel number one, and the last content source is associated with television channel number nine, the media guidance application may select a second content source associated with television channel number five in response to the first user request with a positive direction. However, if the second user request is negative (e.g., relates to decreasing the channel number), the media guidance application may select a third content source associated with television channel number three in response to the second user request.

In some embodiments, the media guidance application may determine a second content source of the consecutively ordered content sources to navigate to based on a number of the consecutively ordered content sources between the first content source and a last content source of the consecutively ordered content sources in the first direction in response to receiving the second user request. For example, the media guidance application may determine a content source that corresponds to a median in the consecutively ordered content sources between the second content source and the last content source. For example, if the first content source is associated with television channel number one, and the last content source is associated with television channel number nine, the media guidance application may select a content source associated with television channel number five.

In some embodiments, the media guidance application may determine a boundary content source. As used herein, "a boundary content source" refers to a content source in the consecutively ordered content source, other than the currently selected content source upon which the media guidance application bases its selection of a different content source to navigate to. In some embodiments, a boundary content source may correspond to a previously navigated to content source or the boundary content source when selecting a current content source.

For example, during an initial iteration, the media guidance application may determine a second content source of the consecutively ordered content sources to navigate to based on a number of the consecutively ordered content sources between a first content source (e.g., a currently selected content source) and a last content source (e.g., the boundary content source). During a second iteration, the media guidance application may determine a third content source of the consecutively ordered content sources to navigate to based on a number of the consecutively ordered content sources between the second content source (e.g., a currently selected content source) and the same boundary content source of the first iteration (e.g., if the direction of both user requests was the same) or a different boundary content source (e.g., if the direction of both user requests was different). If the boundary content source of the second iteration is different than the boundary content source of the first iteration, the boundary content source of the second iteration may correspond to the first content source.

It should be noted that, while embodiments discussed herein recite determining a median of consecutively ordered content sources any mathematical operation to locate a content source between two other content sources in the consecutive ordering could be used (e.g., a mean, average, mode, and/or any other statistical measurement for separating population). It should be further noted that when locating a content source between two other content sources in the consecutive ordering, the media guidance application may weigh the content sources such that the mathematical operation is skewed in one direction or another. For example, the media guidance application may skew the mathematical operation towards content sources that are more popular, associated with particular content, consistent with past viewings of a user, and/or correspond to one or more user preferences. For example, if the first content source is associated with television channel number one, and the last content source is associated with television channel number nine, the media guidance application may skew a determination of the median of the content sources to select a content source associated with television channel number three if the initial content sources are more popular, correspond to user preferences, etc. Additional discussion regarding customization of media content flipping is discussed in Ellis, U.S. patent application Ser. No. 11/888,678, filed Jul. 31, 2007, which is hereby incorporated by reference in its entirety.

It should also be noted that in some embodiments, the media guidance application may round off or otherwise determine a content source of the consecutively ordered content sources that is not the actual result of a mathematical operation (e.g., the arithmetic mean of the two most middlemost terms of an even numbered median sample). For example, if a user subscribes to forty content sources (e.g., numbered one through forty) and the media guidance application determines the median of the content sources in response to a user request, the media guidance application may select a content source associated with either the number twenty or twenty-one.

In some embodiments, upon selecting a second content source, the media guidance application may then navigate to the second content source. For example, in response to a "channel up" command, the media guidance application may navigate to a television channel that is associated with a higher channel number than a current television channel. In another example, in response to a directional arrow "up" command, the media guidance application may navigate to a menu option on a menu page that is associated with a position in a list of menu options above a current menu option. It should be noted that navigating to a content source includes both the state of receiving the media content associated with that content source (e.g., tuning to a particular channel) as well as the state of navigating to a media listing (or grid region in a media guide) associated with the content source without accessing the media content associated with content source.

As used herein, "skipping," sometimes as referred to as "jumping" a content source refers to an operation in which a content source in the consecutively ordered content source is bypassed without requiring a user input to manually navigate to or away from the content source. For example, skipping a content source may include an embodiment in which the media guidance application tunes from one content source to a non-adjacent content source in the consecutively ordered content sources. In another example, skipping a content source may include an embodiment in which the media guidance application invokes an automatic scan from a first content source to a second content source, in which intermediary content source may be tuned to and/or highlighted, but for which a user request is needed to navigate away from the second content source, but not any of the intermediary content sources.

In some embodiments, the media guidance application may receive a plurality of user requests. Furthermore, each subsequent user request may result in the media guidance application skipping fewer content sources than a previous user request when selecting a content source. For example, the number of content sources between the first content source and the last media (e.g., a first subset from which a median is determined) may be greater than the number of content sources between the second content source and the last content source (e.g., a second subset from which a median is determined).

In some embodiments, the media guidance application may continue to reduce the number of content sources that are skipped until there are no additional content sources to skip in a particular direction. For example, the media guidance application may determine whether the number of the consecutively ordered content sources between the first content source and the last content source of the consecutively ordered content sources in the first direction corresponds to one. In response to determining that the number of the consecutively ordered content sources between the first content source and the last content source of the consecutively ordered content sources in the first direction corresponds to one, the media guidance application may select a content source adjacent to the first content source in the consecutively ordered content sources in the first direction as the second content source.

In some embodiments, the media guidance application navigates to a first content source of consecutively ordered content sources in response to a first user request. For example, in response to a user turning on a television, accessing a media guide menu, changing a channel, etc., the media guidance application may present media content or highlight a media listing associated with a particular television channel or content provider. The media guidance application may then receive a second user request to navigate away from the first content source. For example, the user request may correspond to a request to change a television channel.

The media guidance application then determines whether a direction associated with the first user request corresponds to a direction associated with the second user request. For example, in some embodiments, the direction associated with the first user request may correspond to either ascending through the consecutively ordered content sources or descending through the consecutively ordered content sources. For example, if the first user request corresponds to a "channel up" command while surfing television channels or a directional arrow "up" command while scrolling a menu, the media guidance application determines if the second user request also corresponds to "up" (as opposed to "down").

In response to determining that the direction associated with the first user request corresponds to the direction associated with the second user request, the media guidance application determines a number of the consecutively ordered content sources to skip when navigating away from the first content source based on a number of the consecutively ordered content sources that were skipped when navigating to the first content source. For example, if the media guidance application determines that the user has requested two "channel up" commands in a row, the media guidance application may skip more channels in response to the second user request than were skipped in response to the first user request.

In some embodiments, when determining the number of the consecutively ordered content sources to skip when navigating away from the first content source, the media guidance application may base its determination on the number of the consecutively ordered content sources that were skipped when navigating to the first content source. For example, the media guidance application may determine the number of the consecutively ordered content sources that were skipped when navigating to the first content source and then increase (or decrease) that number.

In some embodiments, the increase may be linear, exponential, and/or in accordance with any predetermined, or dynamically calculated mathematical formula. For example, the media guidance application may determine the number of the consecutively ordered content sources that were skipped when navigating to the first content source and add an additional skipped content source when navigating away from a content source. For example, in response to determining that zero content sources were skipped in response to the first user request, the media guidance application may determine to skip one content source in response to the second user request.

In another example, when determining the number of the consecutively ordered content sources when navigating away from the first content source based on the number of the consecutively ordered content sources that were skipped when navigating to the first content source, the media guidance application may determine the number of the consecutively ordered content sources that were skipped when navigating to the first content source. The media guidance application may then increase the number of the consecutively ordered content sources that were skipped when navigating to the first content source by a factor of two. For example, in response to determining that two content sources were skipped in response to the first user request, the media guidance application may determine to skip four content sources in response to the second user request.

In some embodiments, the media guidance application may retrieve a default number of content sources that should be skipped from memory. For example, skipping a default number of content sources may correspond to skipping zero, one, two, or any other number of content sources. For example, in response to determining that the direction associated with the first user request does not correspond to the direction associated with the second user request, the media guidance application may skip a default number of the consecutively ordered content sources when navigating away from the first content source.

In some embodiments, the media guidance application may skip a default number of content sources in response to detecting that a user request has a different direction associated with it than the previous user request. For example, while the media guidance application increases the number of content sources skipped during each subsequent user request associated with the same direction, the media guidance application may reset to skipping a default number or content sources (e.g., zero) in response to receiving a user request associated with an opposite direction.

In some embodiments, the media guidance application may set one or more conditions as to whether or not the number of the consecutively ordered content sources that were skipped when navigating to the first content source affects the number of the consecutively ordered content sources to skip when navigating away from the first content source. For example, in order to better predict the wishes of a user, the media guidance application may compare a user request to temporal or numerical thresholds.

For example, the media guidance application may determine whether the second user request was received within a predetermined time (e.g., within a specific number of seconds, minutes, etc.) of a first user request. In response to determining that the second user request was not received within the predetermined time of the first user request, the media guidance application may skip only a default number of the consecutively ordered content sources when navigating away from the first content source. For example, if a large amount of time has lapsed between the receipt of the first and second user request, a user may not wish for the number of the consecutively ordered content sources that were skipped when navigating to the first content source to affect the number of the consecutively ordered content sources to skip when navigating away from the first content source.

In another example, the media guidance application may determine whether a threshold number of requests was received prior to the second user request. For example, the media guidance application may determine whether a number of user requests received corresponds to a number of user requests that triggers a threshold condition (e.g., such as dynamically increasing the number of content sources that are skipped). In response to determining that the threshold number of requests was not received prior to the second user request, the media guidance application may only skip a default number of the consecutively ordered content sources when navigating away from the first content source. For example, if a user needs to only scroll a few channels (e.g., corresponding to a few user requests), a user may not wish for the media guidance application to dynamically adjust the number of the consecutively ordered content sources that are skipped. The media guidance application may first wait until a threshold number (e.g., five) of user requests are received in series before dynamically adjusting the number of the consecutively ordered content sources that are skipped.

In yet another example, the media guidance application may apply multiple conditions. For example, the media guidance application may determine whether a threshold number of requests was received prior to the second user request within a predetermined time, whether all the user requests meeting the threshold number of requests (or within the predetermined amount of time) all correspond to the same direction, etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of the other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
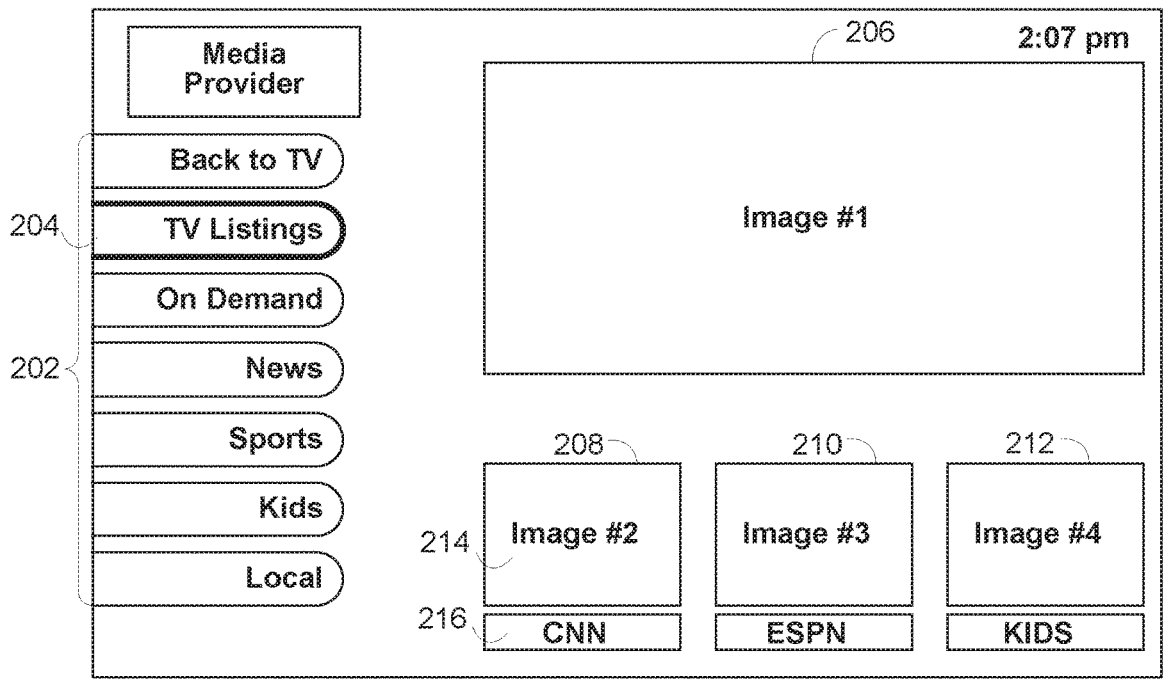
FIG. 2 shows another illustrative example of a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid program listings display 100 arranged by time and channel that also enables access to different types of content in a single display. Display 100 may include grid 102 with: (1) a column of content source identifiers 104, where each content source identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In some embodiments, the media guidance application may allow a user to navigate to and away from a content source (e.g., the content source, "FOX", channel two) associated with a media listing (e.g., program listing 108). The media guidance application may allow a user to skip or jump to non-adjacent program listings (e.g., on-demand listing 114, recorded content listing 116, and Internet content listing 118) associated with other content sources as discussed in FIGS. 5-8 below in a binary and/or dynamic fashion.

For example, if the first content source (e.g., associated with program 108) is associated with a first consecutively ordered content source and the first user request with a positive (e.g., relates to progressing with the consecutively ordered content sources) direction, the media guidance application may select a boundary content source associated with the last available content source (e.g., associated with Internet content listing 118) in a plurality of consecutively ordered content sources. The media guidance application may then select a second content source (e.g., associated with on-demand listing 114) between the first content source and the last available content source. In another example, if the first content source (e.g., associated with Internet content listing 118) is associated with a last consecutively ordered content source and the first user request with a negative (e.g., relates to progressing against the consecutively ordered content sources) direction, the media guidance application may select a boundary content source associated with the first available content source (e.g., associated with program listing 108) in a plurality of consecutively ordered content sources. The media guidance application may then select a second content source (e.g., associated with on-demand listing 114) between the first content source and the first available content source.

In another example, if the first content source (e.g., associated with Internet content listing 118) is associated with a last consecutively ordered content source and the first user request with a negative (e.g., relates to progressing against the consecutively ordered content sources) direction, the media guidance application may select a second content source adjacent to the first content source (e.g., recorded content listing 116) in a plurality of consecutively ordered content sources. In response to a second user request with a negative direction, the media guidance application may select a second content source (e.g., associated with program listing 108) based on the number of content sources (e.g., zero) that was skipped when navigating to the second content source.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

In some embodiments, the media guidance application may allow a user to skip or jump to listings (e.g., listings 206, 208, 210, and 212) associated with other content sources as discussed in FIGS. 5-8 below in a binary and/or dynamic fashion.

For example, if the first content source (e.g., associated with listing 206) is associated with a first consecutively ordered content source and the first user request with a positive (e.g., relates to progressing with the consecutively ordered content sources) direction, the media guidance application may select a boundary content source associated with the last available content source (e.g., associated with listing 212) in a plurality of consecutively ordered content sources. The media guidance application may then select a second content source (e.g., associated with listing 208 or listing 210) between the first content source and the last available content source.

In another example, if the first content source (e.g., associated with listing 212) is associated with a last consecutively ordered content source and the first user request with a negative (e.g., relates to progressing against the consecutively ordered content sources) direction, the media guidance application may select a second content source adjacent to the first content source (e.g., listing 210) in a plurality of consecutively ordered content sources. In response to a second user request with a negative direction, the media guidance application may select a second content source (e.g., associated with listing 206) based on the number of content sources (e.g., zero) that was skipped when navigating to the second content source.

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Dec. 29, 2005, which is hereby incorporated by reference herein in its entirety.

Figure 3:
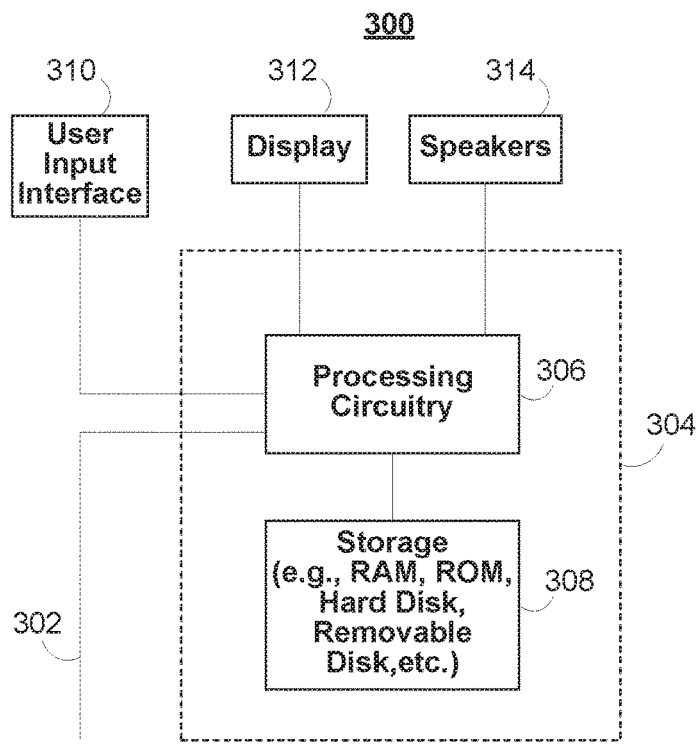
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. User input interface 316 may also include devices capable of detecting brain activity. The use of brain activity to perform media guidance application operations is discussed in depth in Klappert et al., U.S. patent application Ser. No. 14/038,158, filed on Sep. 26, 2013, which is hereby incorporated by reference herein in its entirety.

Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
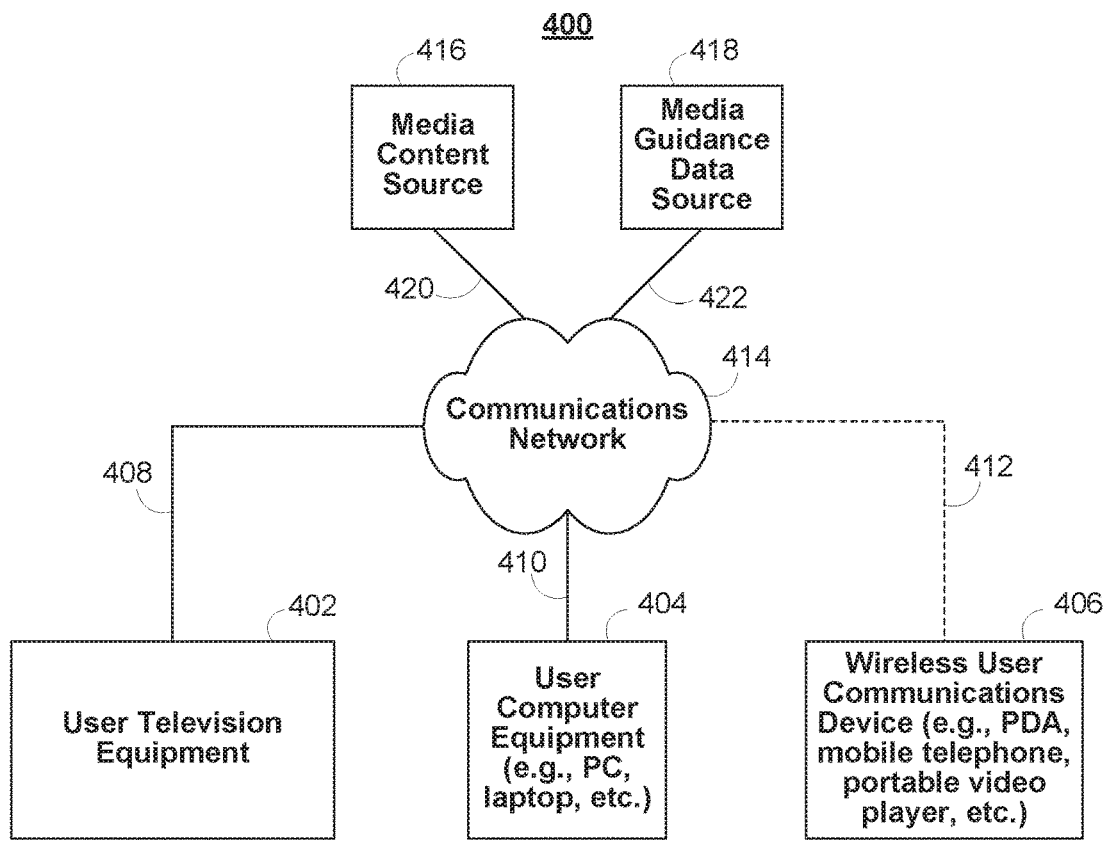
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device.

In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data.

Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT' content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE®, NETFLIX®, and HULU®, which provide audio and video via IP packets. YOUTUBE® is a trademark owned by Google Inc., NETFLIX® is a trademark owned by Netflix Inc., and HULU® is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
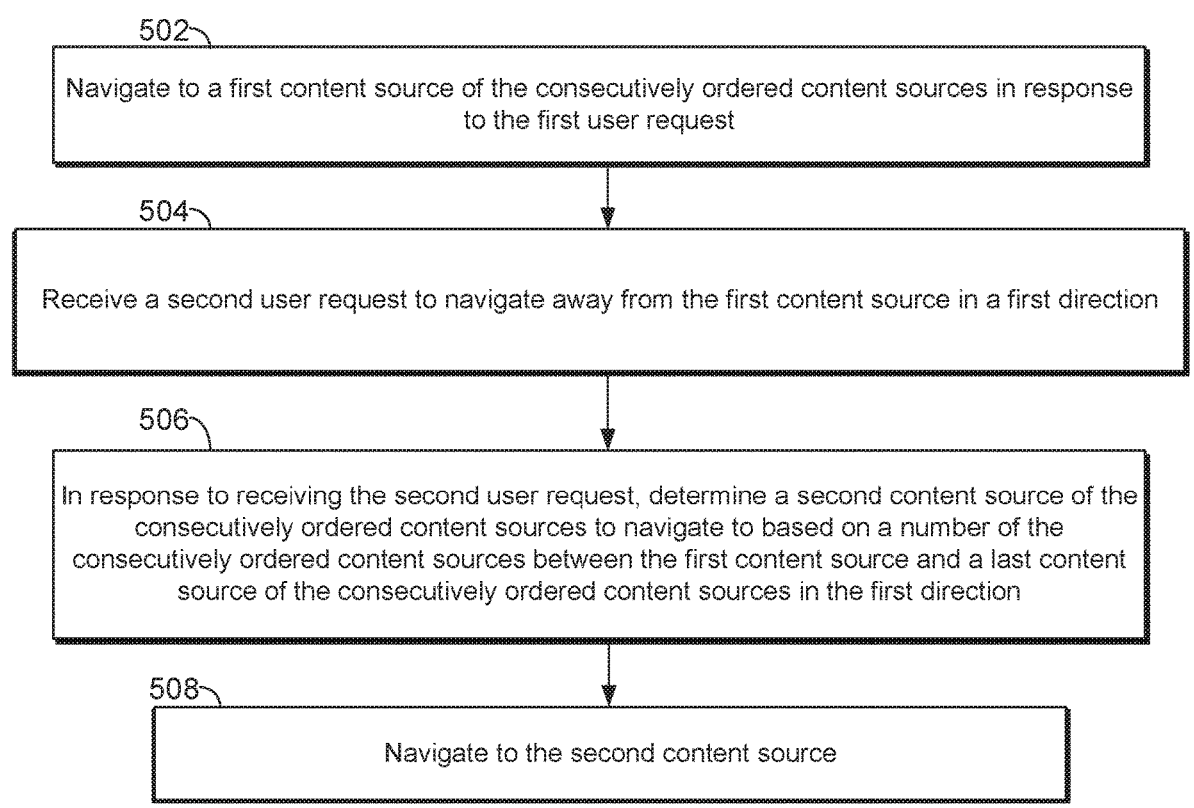
FIG. 5 is a flowchart of illustrative steps for determining a second content source to navigate to based on a number of consecutively ordered content sources between a first content source and a last content source in accordance with some embodiments of the disclosure.

FIG. 5 is a flowchart of illustrative steps for determining a number of consecutively ordered content sources to skip. It should be noted that process 500 or any step thereof could be performed on, or provided by, any of the devices shown in FIGS. 3-4. For example, process 500 may be executed by control circuitry 304 (FIG. 3) as instructed by a media guidance application implemented on a user device (e.g., user equipment devices 402, 404, and/or 406 (FIG. 4)) in order to determine a number of consecutively ordered content sources to skip. In addition, one or more steps of process 500 may be incorporated into or combined with one or more steps of any other process or embodiment (e.g., as described in relation to FIGS. 6-8).

At step 502, a media guidance application navigates (e.g., via control circuitry 304 (FIG. 3)) to a first content source of consecutively ordered content sources in response to a first user request (e.g., received via user input interface 310 (FIG. 3) on user equipment device 402, 404, or 406 (FIG. 4)). For example, in response to a user turning on a smartphone, accessing a playlist, tuning a television, etc., the media guidance application (e.g., via control circuitry 304 (FIG. 3)) may present (e.g., on display 312 (FIG. 3)) media content or highlight a media listing (e.g., program listing 108 (FIG. 1)) associated with a content source.

At step 504, the media guidance application receives (e.g., received via user input interface 310 (FIG. 3) on user equipment device 402, 404, or 406 (FIG. 4)) a second user request to navigate away from the first content source in a first direction. For example, the user request may correspond to a "channel up" command (e.g., received via user input interface 310 (FIG. 3) on user equipment device 402, 404, or 406 (FIG. 4)) while a user was surfing television channels or a directional arrow "up" command (e.g., received via user input interface 310 (FIG. 3) on user equipment device 402, 404, or 406 (FIG. 4)) while a user was perusing a menu. In some embodiments, the media guidance application may (e.g., via control circuitry 304 (FIG. 3)) determine the direction associated with a user request based on a user input (e.g., a button associated with scrolling in a particular direction such as an arrow key) received (e.g., via user input interface 310 (FIG. 3)) selected by a user.

At step 506, in response to receiving the second user request, the media guidance application determines (e.g., via control circuitry 304 (FIG. 3)) a second content source of the consecutively ordered content sources to navigate to based on a number of the consecutively ordered content sources between the first content source and a last content source of the consecutively ordered content sources in the first direction. For example, the media guidance application may determine a content source that corresponds to a median in the consecutively ordered list between the first content source and the last content source. For example, if consecutively ordered content sources are ordered alphabetically and include a first content source (e.g., a cell in a mosaic display associated with media asset beginning with the letter "a") and a boundary content source (e.g., a cell in a mosaic display associated with media asset beginning with the letter "a"), the media guidance application may select a content source between them in the consecutively ordered content sources (e.g., a cell in a mosaic display associated with media asset beginning with the letter "m").

At step 508, the media guidance application (e.g., via control circuitry 304 (FIG. 3)) navigates to the second content source. For example, in response to a directional arrow "up" command (e.g., received via user input interface 310 (FIG. 3)), the media guidance application may navigate to a listing (e.g., listing 206 (FIG. 2)) that is positioned above a current listing (e.g., listing 212 (FIG. 2)) while skipping over intermediary listings (e.g., listings 208 and 210 (FIG. 2)).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 5.

Figure 6:
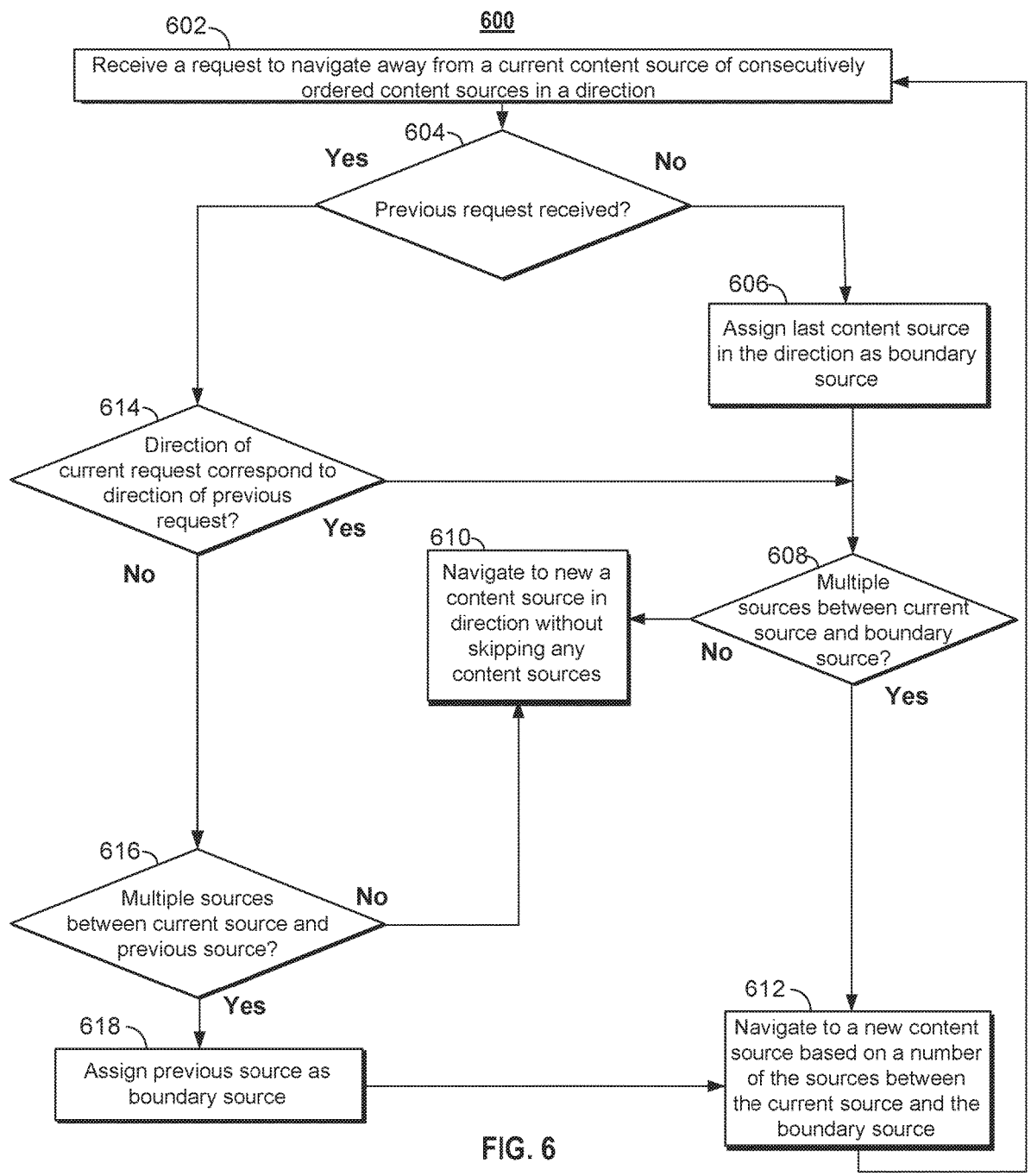
FIG. 6 is a flowchart of illustrative steps for determining a number of consecutively ordered content sources to skip in accordance with some embodiments of the disclosure.

FIG. 6 is a flowchart of illustrative steps for determining a number of consecutively ordered content sources to skip. It should be noted that process 600 or any step thereof could be performed on, or provided by, any of the devices shown in FIGS. 3-4. For example, process 600 may be executed by control circuitry 304 (FIG. 3) as instructed by a media guidance application implemented on a user device (e.g., user equipment devices 402, 404, and/or 406 (FIG. 4)) in order to determine a number of consecutively ordered content sources to skip. In addition, one or more steps of process 600 may be incorporated into or combined with one or more steps of any other process or embodiment (e.g., as described in relation to FIGS. 5 and 7-8).

At step 602, the media guidance application receives (e.g., via user input interface 310 (FIG. 3)) a request to navigate away from a current content source of consecutively ordered content sources in a direction. In some embodiments, step 602 may correspond to step 504 (FIG. 5)). For example, the media guidance application may receive (e.g., via user input interface 310 (FIG. 3) on user equipment device 402, 404, or 406 (FIG. 4)) a request to navigate away from the current content source in a first direction. For example, the user request may correspond to a "channel up" command (e.g., received via user input interface 310 (FIG. 3) on user equipment device 402, 404, or 406 (FIG. 4)) while a user was surfing television channels or a directional arrow "up" command (e.g., received via user input interface 310 (FIG. 3) on user equipment device 402, 404, or 406 (FIG. 4)) while a user was perusing a menu. In some embodiments, the media guidance application may (e.g., via control circuitry 304 (FIG. 3)) determine the direction associated with a user request based on a user input (e.g., a button associated with scrolling in a particular direction such as an arrow key) received (e.g., via user input interface 310 (FIG. 3)) selected by a user.

At step 604, the media guidance application determines (e.g., via control circuitry 304 (FIG. 3)) whether or not a previous user request was received (e.g., via user input interface 310 (FIG. 3)). For example, the media guidance application may determine (e.g., via control circuitry 304 (FIG. 3)) to perform different operations and/or retrieve different data (e.g., skip different numbers of content sources, use different boundary content sources, etc.) based on whether or not a previous user request was received (e.g., via user input interface 310 (FIG. 3)). To determine (e.g., via control circuitry 304 (FIG. 3)) whether or not one or more previous requests were received, the media guidance application may reference an event log (e.g., located at storage 308 (FIG. 3) or any location accessible via communications network 414 (FIG. 4)). If the media guidance application determines (e.g., via control circuitry 304 (FIG. 3)) that a previous request has not been received, the media guidance application (e.g., via control circuitry 304 (FIG. 3)) proceeds to step 606. If the media guidance application determines (e.g., via control circuitry 304 (FIG. 3)) that a previous request has been received, the media guidance application proceeds (e.g., via control circuitry 304 (FIG. 3)) to step 614.

At step 606, the media guidance application assigns (e.g., via control circuitry 304 (FIG. 3)) a last content source of the consecutively ordered content sources in the direction as boundary content source before proceeding to step 608. As described above, a boundary content source is a content source in the consecutively ordered content source, other than the currently selected content source upon which the media guidance application bases its selection of a different content source to navigate to. The media guidance application may designate (e.g., via control circuitry 304 (FIG. 3)) a content source as a boundary content source in response to determining (e.g., via control circuitry 304 (FIG. 3)) that such content source is the last content source in the consecutively ordered content sources in the direction of the user request. For example, if the consecutively ordered content sources range from channel number one to channel number one hundred, the current content source is one (e.g., selected in response to the user powering on a device, selected in response to the user accessing a menu, selected as being a favorite channel of the user, selected as being the last channel the user was tuned to, etc.), and the direction of the user request is position (e.g., corresponding to an "up" command), the media guidance application may determine (e.g., via control circuitry 304 (FIG. 3)) channel one hundred (i.e., that last content source in the range of consecutively ordered content sources is the boundary source).

In another example, if the consecutively ordered content sources range from channel number one to channel number one hundred, the current content source is one hundred, and the direction of the user request is negative (e.g., correspond to an "down" command), the media guidance application may determine (e.g., via control circuitry 304 (FIG. 3)) channel one is the boundary content source. In yet another example, if the consecutively ordered content sources range from channel number one to channel number one hundred, the current content source is fifty, and the direction of the user request is negative (e.g., corresponding to an "down" command), the media guidance application may once again determine (e.g., via control circuitry 304 (FIG. 3)) channel one is the boundary content source.

The media guidance application may store (e.g., at storage 308 (FIG. 3) or any location accessible via communications network 414 (FIG. 4)) the designation of the last content source for later retrieval when determining (e.g., via control circuitry 304 (FIG. 3)) a new content source for selecting (e.g., via control circuitry 304 (FIG. 3)) in response to the user request (e.g., received via user input interface 310 (FIG. 3)) to navigate away from a current content source.

At step 608, the media guidance application determines (e.g., via control circuitry 304 (FIG. 3)) whether or not there are multiple content sources of the consecutively ordered content sources between the current content source and the boundary content source. For example, if there is only a single content source between the current content source and the boundary content source, the media guidance application may simply navigate (e.g., via control circuitry 304 (FIG. 3)) to the single content source. In another example, the media guidance application may determine (e.g., via control circuitry 304 (FIG. 3)) whether or not there is a threshold number (e.g., retrieved from storage 308 (FIG. 3) or any location accessible via communications network 414 (FIG. 4)) of content sources (e.g., three) between the current content source and the boundary content source. If the number of content sources between the current content source and the boundary content source does not correspond to the threshold number, the media guidance application may proceed to step 610 and determine (e.g., via control circuitry 304 (FIG. 3)) not to skip any content sources in response to a user request (e.g., as discussed below in relation to step 810 (FIG. 8)).

If the media guidance application determines (e.g., via control circuitry 304 (FIG. 3)) that there are multiple content sources of the consecutively ordered content sources between the current content source and the boundary content source at step 608, the media guidance application proceeds to step 612. At step 612, the media guidance application navigates to a new content source based on a number of the sources between the current source and the boundary source. For example, in some embodiments, step 612 may correspond to step 508 (FIG. 5)). For example, the media guidance application may (e.g., via control circuitry 304 (FIG. 3)) navigate to the new content source. For example, in response to a directional arrow "up" command (e.g., received via user input interface 310 (FIG. 3)), the media guidance application may navigate to a listing (e.g., listing 206 (FIG. 2)) that is positioned above a current listing (e.g., listing 212 (FIG. 2)) while skipping over intermediary listings (e.g., listings 208 and 210 (FIG. 2)). The content sources that are skipped over may correspond to content sources in the consecutively ordered content sources that do not correspond to a median (or other appropriate mathematical operation selected by the media guidance application) between the current content source and the boundary content source as determined (e.g., via control circuitry 304 (FIG. 3)) by the media guidance application.

After navigating to the new content source, the media guidance application returns to step 602, and may receive a request to navigate away from a current content source (e.g., the new content source of step 612) of consecutively ordered content sources in a direction. After receiving the request at step 602, the media guidance application once again proceeds to step 604. During this iteration of process 600, the media guidance application may determine (e.g., via control circuitry 304 (FIG. 3)) that a previous user request (e.g., a request received during a previous iteration was received). If the media guidance application determines (e.g., via control circuitry 304 (FIG. 3)) that a previous request has been received, the media guidance application proceeds (e.g., via control circuitry 304 (FIG. 3)) to step 614.

At step 614, the media guidance application determines whether or not the direction of the current request corresponds to the direction of the previous request (e.g., the request detected in step 604). If the media guidance application determines at step 614 that the direction of the current request corresponds to the direction of the previous request, the media guidance application proceeds to step 608. If the media guidance application determines at step 614 that the direction of the current request does not correspond to the direction of the previous request, the media guidance application proceeds to step 616.

In some embodiments, step 614 may correspond to step 806 (FIG. 8)). For example, the media guidance application determines (e.g., via control circuitry 304 (FIG. 3)) whether a direction associated with the previous user request (e.g., stored locally at storage 308 (FIG. 3) or remotely at any location accessible via communications network 414 (FIG. 4)) corresponds to a direction associated with the current request. For example, if the current user request (e.g., received via user input 310 (FIG. 3)) corresponds to a "channel up" command while surfing television channels or a directional arrow "up" command while scrolling a menu, the media guidance application (e.g., via control circuitry 304 (FIG. 3)) determines if the previous user request also corresponds to "up" (as opposed to "down").

At step 616, the media guidance application determines (e.g., via control circuitry 304 (FIG. 3)) whether or not there are multiple content sources of the consecutively ordered content sources between the current content source and the previous content source. For example, if there is only a single content source between the current content source and the previous content source, the media guidance application may simply navigate (e.g., via control circuitry 304 (FIG. 3)) to the single content source. In another example, the media guidance application may determine (e.g., via control circuitry 304 (FIG. 3)) whether or not there is a threshold number (e.g., retrieved from storage 308 (FIG. 3) or any location accessible via communications network 414 (FIG. 4)) of content sources (e.g., three) between the current content source and the previous content source as discussed above in relation to step 608.

If the media guidance application determines (e.g., via control circuitry 304 (FIG. 3)) that there are not multiple content sources of the consecutively ordered content sources between the current content source and the previous content source at step 616, the media guidance application proceeds to step 610 as discussed above. If the media guidance application determines (e.g., via control circuitry 304 (FIG. 3)) that there are multiple content sources of the consecutively ordered content sources between the current content source and the previous content source at step 616, the media guidance application proceeds to step 618.

At step 618, the media guidance application assigns the previous content source as the boundary content source. For example, the media guidance application may replace (e.g., via control circuitry 304 (FIG. 3)) the boundary content source (e.g., assigned in step 606) in memory (e.g., storage 308 (FIG. 3) or communications network 414 (FIG. 4)) with the previous content source, and proceeds to step 612. At step 612, the media guidance application navigates (e.g., via control circuitry 304 (FIG. 3)) to a new content source based on a number of the sources between the current source and the boundary source, as discussed above.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
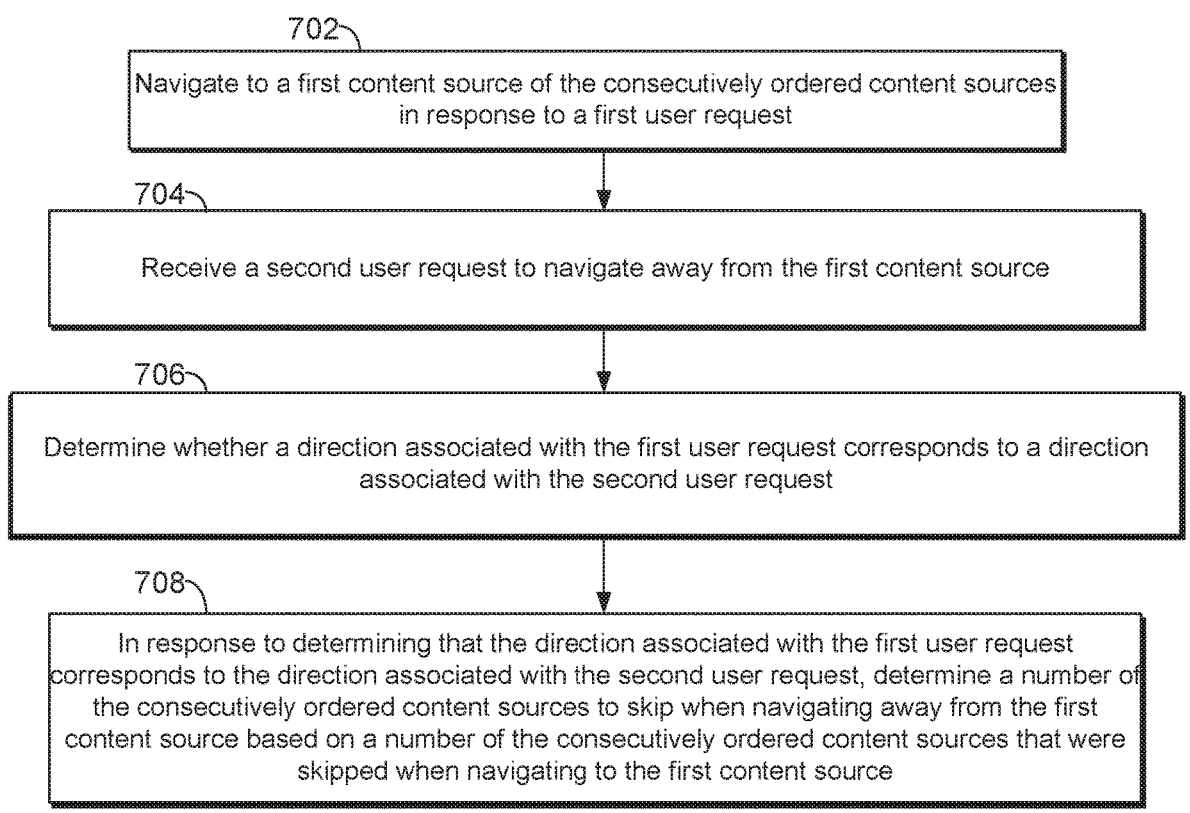
FIG. 7 is a flowchart of illustrative steps for determining a number of the consecutively ordered content sources to skip when navigating away from a first content source based on a number of the consecutively ordered content sources that were skipped when navigating to the first content source in accordance with some embodiments of the disclosure.

FIG. 7 is a flowchart of illustrative steps for determining a number of consecutively ordered content sources to skip. It should be noted that process 700 or any step thereof could be performed on, or provided by, any of the devices shown in FIGS. 3-4. For example, process 700 may be executed by control circuitry 304 (FIG. 3) as instructed by a media guidance application implemented on a user device (e.g., user equipment devices 402, 404, and/or 406 (FIG. 4)) in order to determine a number of consecutively ordered content sources to skip. In addition, one or more steps of process 700 may be incorporated into or combined with one or more steps of any other process or embodiment (e.g., as described in relation to FIGS. 5-6 and 8).

At step 702, the media guidance application navigates (e.g., via control circuitry 304 (FIG. 3)) to a first content source of consecutively ordered content sources in response to a first user request (e.g., received via user input interface 310 (FIG. 3)). For example, in response to a user turning on a television, accessing a media guide menu, or changing a channel (e.g., received via user input interface 310 (FIG. 3)), the media guidance application may (e.g., received via user input interface 310 (FIG. 3)) present (e.g., on display 312

(FIG. 3) or user equipment device 402, 404, or 406 (FIG. 4)) media content or highlight a media listing associated with a particular content source.

At step 704, the media guidance application receives (e.g., via user input interface 310 (FIG. 3)) a second user request to navigate away from the first content source. For example, the user request may correspond to a request to change a television channel or to access a different media asset provided by a different content source. For example, the media guidance application may receive a "skip" request while a playlist of media assets is being presented to a user. In response, the media guidance application may navigate away from a currently presented media asset from a first content source (e.g., author, producer, album, track, etc.) to another media asset from a second content source (e.g., author, producer, album, track, etc.).

At step 706, the media guidance application determines (e.g., via control circuitry 304 (FIG. 3)) whether a direction associated with the first user request (e.g., store locally at storage 308 (FIG. 3) or remotely at any location accessible via communications network 414 (FIG. 4)) corresponds to a direction associated with the second user request. For example, in some embodiments, the direction associated with the first user request may correspond to either ascending through the consecutively ordered content sources or descending through the consecutively ordered content sources. For example, if the first user request (e.g., received via user input 310 (FIG. 3)) corresponds to a "channel up" command while surfing television channels or a directional arrow "up" command while scrolling a menu, the media guidance application (e.g., via control circuitry 304 (FIG. 3)) determines if the second user request also corresponds to "up" (as opposed to "down").

At step 708, in response to determining (e.g., via control circuitry 304 (FIG. 3)) that the direction (e.g., retrieved from storage 308 (FIG. 3) or any location accessible via communications network 414 (FIG. 4)) associated with the first user request (e.g., received via user input interface 310 (FIG. 3)) corresponds to the direction associated with the second user request (e.g., received via user input interface 310 (FIG. 3)), the media guidance application determines (e.g., via control circuitry 304 (FIG. 3)) a number of the consecutively ordered content sources to skip when navigating away from the first content source based on a number e.g., retrieved from storage 308 (FIG. 3) or any location accessible via communications network 414 (FIG. 4)) of the consecutively ordered content sources that were skipped when navigating to the first content source. For example, if the media guidance application determines (e.g., via control circuitry 304 (FIG. 3)) that the user has requested two "channel up" commands in a row (e.g., based on data retrieved from storage 308 (FIG. 3) or any location accessible via communications network 414 (FIG. 4)), the media guidance application may skip (e.g., via control circuitry 304 (FIG. 3)) more channels in response to the second user request (e.g., received via user input interface 310 (FIG. 3)) than were skipped in response to the first user request (e.g., received via user input interface 310 (FIG. 3)).

In some embodiments, when determining (e.g., via control circuitry 304 (FIG. 3)) the number of the consecutively ordered content sources to skip when navigating away from the first content source based on the number (e.g., retrieved from storage 308 (FIG. 3) or any location accessible via communications network 414 (FIG. 4)) of the consecutively ordered content sources that were skipped when navigating to the first content source, the media guidance application may further determine (e.g., via control circuitry 304 (FIG. 3)) the number of the consecutively ordered content sources that were skipped when navigating to the first content source. The media guidance application may then increase or decrease (e.g., via control circuitry 304 (FIG. 3)) the number of the consecutively ordered content sources that are skipped when navigating away from the first content source compared to this number. For example, in response to determining (e.g., via control circuitry 304 (FIG. 3)) that zero content sources were skipped in response to the first user request (e.g., received via user input interface 310 (FIG. 3)), the media guidance application may determine (e.g., via control circuitry 304 (FIG. 3)) to skip one content source in response to the second user request (e.g., received via user input interface 310 (FIG. 3)).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

Figure 8:
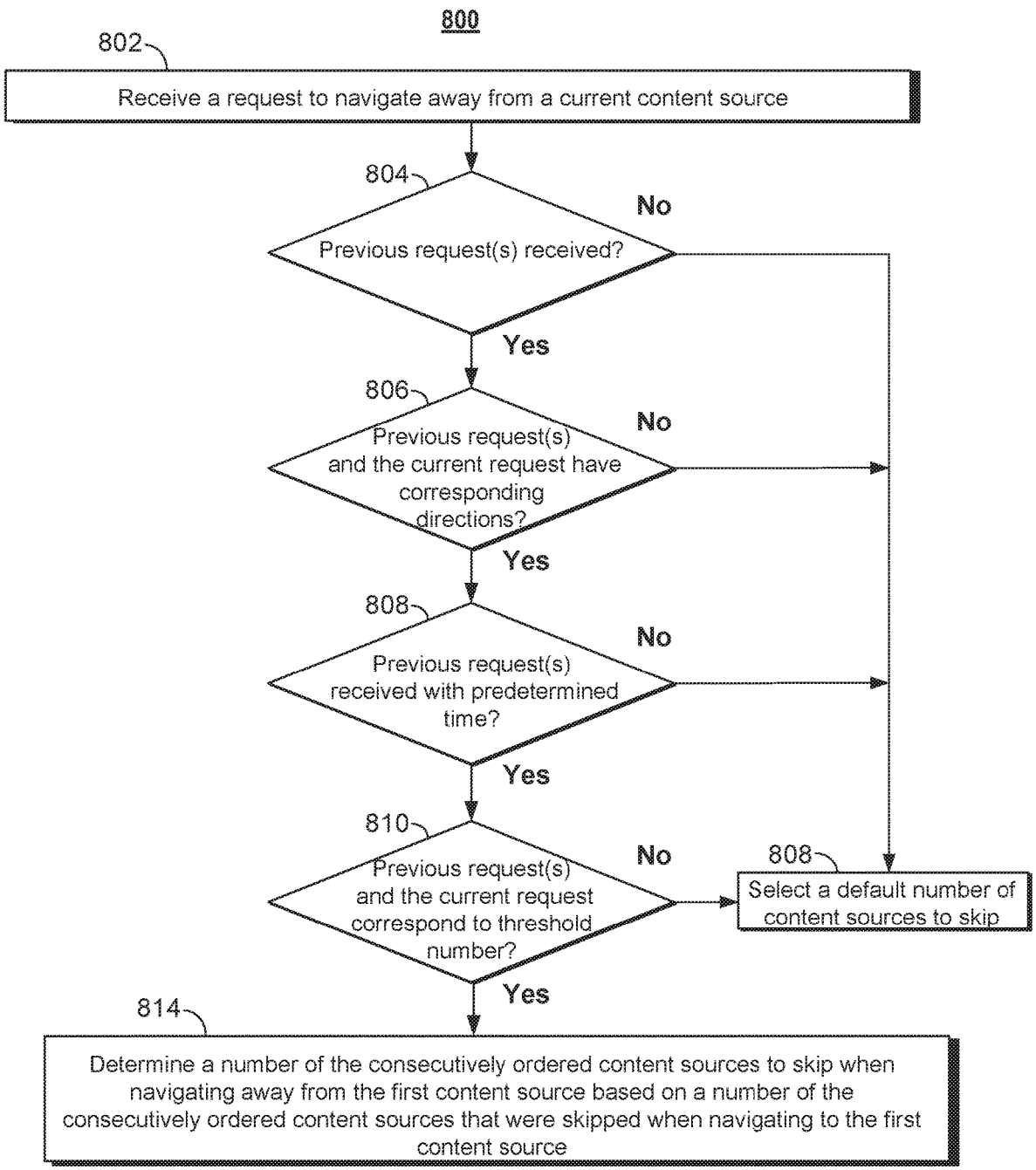
FIG. 8 is a flowchart of illustrative steps for applying conditions that may affect the number of content sources that are skipped in accordance with some embodiments of the disclosure.

FIG. 8 is a flowchart of illustrative steps for determining a number of consecutively ordered content sources to skip. It should be noted that process 800 or any step thereof could be performed on, or provided by, any of the devices shown in FIGS. 3-4. For example, process 800 may be executed by control circuitry 304 (FIG. 3) as instructed by a media guidance application implemented on a user device (e.g., user equipment devices 402, 404, and/or 406 (FIG. 4)) in order to determine a number of consecutively ordered content sources to skip. In addition, one or more steps of process 800 may be incorporated into or combined with one or more steps of any other process or embodiment (e.g., as described in relation to FIGS. 5-7).

At step 802, the media guidance application receives a request to navigate away from a current content source. For example, in some embodiments, step 802 may correspond to step 704 (FIG. 7)). For example, the media guidance application receives (e.g., via user input interface 310 (FIG. 3)) a user request to navigate away from the current content source (e.g., a content source that is currently being accessed by a user or is currently being highlighted by a user). For example, the user request may correspond to a request to change a television channel or to access a different media asset provided by a different content source.

At step 804, the media guidance application determines (e.g., via control circuitry 304 (FIG. 3)) whether or not a previous request or requests have been received (e.g., via user input interface 310 (FIG. 3)). In some embodiments, step 804 may correspond to step 604 (FIG. 6)). For example, in some embodiments, the media guidance application may determine (e.g., via control circuitry 304 (FIG. 3)) to perform different operations (e.g., skip different numbers of consecutively ordered content sources) based on the number of previous user requests (e.g., via user input interface 310 (FIG. 3)). To determine (e.g., via control circuitry 304 (FIG. 3)) whether or not one or more previous requests were received, the media guidance application may reference an event log (e.g., located at storage 308 (FIG. 3) or any location accessible via communications network 414 (FIG. 4)). If the media guidance application determines (e.g., via control circuitry 304 (FIG. 3)) that no previous requests have been received, the media guidance application (e.g., via control circuitry 304 (FIG. 3)) proceeds to step 812. If the media guidance application determines (e.g., via control circuitry 304 (FIG. 3)) that one or more previous requests have been received, the media guidance application proceeds (e.g., via control circuitry 304 (FIG. 3)) to step 806.

At step 806, the media guidance application determines (e.g., via control circuitry 304 (FIG. 3)) whether or not one or more of the previous requests and the current request have corresponding directions. In some embodiments, step 806 may correspond to step 706 (FIG. 7)). For example, the media guidance application determines (e.g., via control circuitry 304 (FIG. 3)) whether a direction associated with one or more of the previous user requests (e.g., stored locally at storage 308 (FIG. 3) or remotely at any location accessible via communications network 414 (FIG. 4)) corresponds to a direction associated with the current user request. For example, if the current user request (e.g., received via user input 310 (FIG. 3)) corresponds to a "channel up" command while surfing television channels or a directional arrow "up" command while scrolling a menu, the media guidance application (e.g., via control circuitry 304 (FIG. 3)) determines if the previous user request also corresponds to "up" (as opposed to "down").

In some embodiments, the media guidance application may reset (e.g., via control circuitry 304 (FIG. 3)) the number of previous user requests or stop storing (e.g., locally at storage 308 (FIG. 3) or remotely at any location accessible via communications network 414 (FIG. 4)) data associated with all previous user requests (e.g., received via user input interface 310 (FIG. 3)) in response to determining (e.g., via control circuitry 304 (FIG. 3)) that the direction associated with a current user request does not correspond to the direction of a previous user request. If the media guidance application determines that one or more of the previous requests and the current requests do not have corresponding directions, the media guidance application (e.g., via control circuitry 304 (FIG. 3)) proceeds to step 812. If the media guidance application determines that the one or more previous requests and the current requests do have corresponding directions, the media guidance application (e.g., via control circuitry 304 (FIG. 3)) proceeds to step 808.

At step 808, the media guidance application (e.g., via control circuitry 304 (FIG. 3)) determines whether or not the previous one or more requests were received during a predetermined time (e.g., retrieved from storage 308 (FIG. 3) or any location accessible via communications network 414 (FIG. 4)). For example, the media guidance application may determine (e.g., via control circuitry 304 (FIG. 3)) whether a current user request was received (e.g., via user input interface 310 (FIG. 3)) within a predetermined amount of time (e.g., two seconds) from a previous user request (e.g., via user input interface 310 (FIG. 3)). In response to determining (e.g., via control circuitry 304 (FIG. 3)) that the current user request was not received within the predetermined amount of time from the previous user request, the media guidance application proceeds (e.g., via control circuitry 304 (FIG. 3)) to step 812. For example, if a large amount of time has lapsed between the receipt of the previous and current user requests, the media guidance application may determine (e.g., via control circuitry 304 (FIG. 3)) that a user may not wish for the number of the consecutively ordered content sources that were skipped when navigating to the current content source to affect the number of the consecutively ordered content sources to skip when navigating away from the current content source. In response to determining (e.g., via control circuitry 304 (FIG. 3)) that the current user request was received within the predetermined amount of time from the previous user request, the media guidance application proceeds (e.g., via control circuitry 304 (FIG. 3)) to step 810.

At step 810, the media guidance application determines (e.g., via control circuitry 304 (FIG. 3)) whether or not the number of previous requests and the current requests correspond to a threshold number (e.g., stored locally at storage 308 (FIG. 3) or remotely at any location accessible via communications network 414 (FIG. 4)). For example, the media guidance application may determine (e.g., via control circuitry 304 (FIG. 3)) whether a threshold number of requests was received prior to the second user request.

To do so, the media guidance application compares (e.g., via control circuitry 304 (FIG. 3)) the number of previous requests and/or the current request to the threshold number (e.g., retrieved from storage 308 (FIG. 3) or any location accessible via communications network 414 (FIG. 4)). In response to determining (e.g., control circuitry 304 (FIG. 3)) that a threshold number of requests was not received prior to, and/or including, the current user request, the media guidance application proceeds (e.g., via control circuitry 304 (FIG. 3)) to step 812. For example, the media guidance application may determine (e.g., via control circuitry 304 (FIG. 3)) that if a user needs to only scroll a few channels (e.g., corresponding to a few user requests), the user may not wish for the media guidance application to dynamically adjust the number of the consecutively ordered content sources that are skipped. In response to determining (e.g., via control circuitry 304 (FIG. 3)) that a threshold number of requests was received prior to, and/or including, the current user request, the media guidance application proceeds (e.g., via control circuitry 304 (FIG. 3)) to step 814.

At step 814, the media guidance application determines a number of the consecutively ordered content sources to skip when navigating away from the first content source based on a number of the consecutively ordered content sources that were skipped when navigating to the first content source. In some embodiments, step 814 may correspond to step 708 (FIG. 7). For example, the media guidance application may determine (e.g., via control circuitry 304 (FIG. 3)) a number of the consecutively ordered content sources to skip when navigating away from the first content source based on a number e.g., retrieved from storage 308 (FIG. 3) or any location accessible via communications network 414 (FIG. 4)) of the consecutively ordered content sources that were skipped when navigating to the current content source. For example, if the media guidance application determines (e.g., via control circuitry 304 (FIG. 3)) that the user has requested two "page up" commands in a row (e.g., based on data retrieved from storage 308 (FIG. 3) or any location accessible via communications network 414 (FIG. 4)), the media guidance application may skip (e.g., via control circuitry 304 (FIG. 3)) more media listings (e.g., each associated with a particular content source) in response to the current user request (e.g., received via user input interface 310 (FIG. 3)) than were skipped in response to the previous user request (e.g., received via user input interface 310 (FIG. 3)).

In some embodiments, when determining (e.g., via control circuitry 304 (FIG. 3)) the number of the consecutively ordered content sources to skip when navigating away from the first content source based on the number (e.g., retrieved from storage 308 (FIG. 3) or any location accessible via communications network 414 (FIG. 4)) of the consecutively ordered content sources that were skipped when navigating to the current content source, the media guidance application may further determine (e.g., via control circuitry 304 (FIG.

3)) the number of the consecutively ordered content sources that were skipped during previous user requests. The media guidance application may then increase or decrease (e.g., via control circuitry 304 (FIG. 3)) the number of the consecutively ordered content sources that are skipped during the previous user requests compared to this number. For example, in response to determining (e.g., via control circuitry 304 (FIG. 3)) that zero content sources were skipped in response to the previous user request (e.g., received via user input interface 310 (FIG. 3)), the media guidance application may determine (e.g., via control circuitry 304 (FIG. 3)) to skip one content source in response to the current user request (e.g., received via user input interface 310 (FIG. 3)). By gradually increasing the number of content sources that are skipped, by ensuring that previous user requests are received within a predetermined time, or by first determining whether a threshold number of previous user requests of the same direction are received, the media guidance application better anticipates the needs of a user.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 8.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of navigating media content, the method comprising:
    navigating, using control circuitry, to a first content selection within a graphical user interface (GUI) display of content selections in response to a first user request, wherein the GUI comprises a plurality of content selections of content categories, providers, and programs;
    receiving, using the control circuitry, a second user request to navigate away from the first content selection;
    determining, using the control circuitry, whether a GUI navigation direction associated with the first user request corresponds to a direction associated with the second user request, wherein a direction corresponds to a direction of change between one of content categories, content providers, advertisements, or content programs within the GUI display; and
    in response to determining that the direction associated with the first user request corresponds to the direction associated with the second user request:
        determining, using the control circuitry, a number of content selections that were skipped when navigating to the first content selection; and
        determining, using the control circuitry and based on the determined number of content selections that were skipped when navigating to the first content selection, to skip an increased number of the selections when navigating away from the first content selection than the number of the content selections that were skipped when navigating to the first content selection, wherein the increased number of selections is independent of a time of the first user request.

2. The method of claim 1, wherein determining, using the control circuitry and based on the determined number of content selections that were skipped when navigating to the first content selection, to skip the increased number of the content selections when navigating away from the first content selection than the number of the content selections that were skipped when navigating to the first content selection, comprises:
    increasing the number of the content selections that were skipped when navigating to the first content selection by one.

3. The method of claim 1, wherein determining, using the control circuitry and based on the determined number of content selections that were skipped when navigating to the first content selection, to skip the increased number of the content selections when navigating away from the first content selection than the number of the content selections that were skipped when navigating to the first content selection, comprises:
    increasing the number of the content selections that were skipped when navigating to the first content selection by a factor of two.

4. The method of claim 1, further comprising:
    in response to determining that the direction associated with the first user request does not correspond to the direction associated with the second user request, skipping a default number of the content selections when navigating away from the first content selection.

5. The method of claim 4, wherein the default number of content selections is zero.

6. The method of claim 1, wherein the direction associated with the first user request corresponds to either ascending through the content selections or descending through the content selections.

7. The method of claim 1, further comprising:
    determining whether the second user request was received within a predetermined time of a first user request; and
    in response to determining that the second user request was not received within the predetermined time of the first user request, skipping a default number of the content selections when navigating away from the first content selection.

8. The method of claim 1, further comprising:
    determining whether a threshold number of requests was received prior to the second user request; and
    in response to determining that the threshold number of requests was not received prior to the second user request, skipping a default number of the content selections when navigating away from the first content selection.

9. The method of claim 8, further comprising determining whether the threshold number of requests was received prior to the second user request within a predetermined time.

10. The method of claim 8, wherein the threshold number of requests all correspond to a first direction.

11. A system for navigating media content, the system comprising:
   user input interface circuitry configured to receive user requests; and
   control circuitry configured to:
   navigate to a first content selection within a graphical user interface (GUI) display of content selections in response to a first user request received from the user input interface circuitry;
   receive from the user input interface circuitry a second user request to navigate away from the first content selection;
   determine whether a GUI navigation direction associated with the first user request corresponds to a direction associated with the second user request, wherein a direction corresponds to a direction of change between one of content categories, content providers, advertisements, or content programs within the GUI display; and
   in response to determining that the direction associated with the first user request corresponds to the direction associated with the second user request:
   determine a number of the content selections that were skipped when navigating to the first content selection; and
   determine, based on the determined number of the content selections that were skipped when navigating to the first content selection, to skip an increased number of the content selections when navigating away from the first content selection than the number of the content selections that were skipped when navigating to the first content selection, wherein the increased number of selections is independent of a time of the first user request.

12. The system of claim 11, wherein the control circuitry configured to determine, based on the determined number of content selections that were skipped when navigating to the first content selection, to skip the increased number of the content selections when navigating away from the first content selection than the number of the content selection that were skipped when navigating to the first content selection, is further configured to:
   increase the number of the content selections that were skipped when navigating to the first content selection by one.

13. The system of claim 11, wherein the control circuitry configured to determine, based on the determined number of content selections that were skipped when navigating to the first content selection, to skip the increased number of the content selections when navigating away from the first content selection than the number of the content selections that were skipped when navigating to the first content selection, is further configured to:
   increase the number of the content selections that were skipped when navigating to the first content selection by a factor of two.

14. The system of claim 11, wherein the control circuitry is further configured to:
   in response to determining that the direction associated with the first user request does not correspond to the direction associated with the second user request, skip a default number of the content selections when navigating away from the first content selection.

15. The system of claim 14, wherein the default number of content selections is zero.

16. The system of claim 11, wherein the direction associated with the first user request corresponds to either ascending through the content selections or descending through the content selections.

17. The system of claim 11, wherein the control circuitry is further configured to:
   determine whether the second user request was received within a predetermined time of a first user request; and
   in response to determining that the second user request was not received within the predetermined time of the first user request, skip a default number of the content selections when navigating away from the first content selection.

18. The system of claim 11, wherein the control circuitry is further configured to:
   determine whether a threshold number of requests was received prior to the second user request; and
   in response to determining that the threshold number of requests was not received prior to the second user request, skip a default number of the content selections when navigating away from the first content selection.

19. The system of claim 18, wherein the control circuitry is further configured to determine whether the threshold number of requests was received prior to the second user request within a predetermined time.

20. The system of claim 18, wherein the threshold number of requests all correspond to a first direction.

* * * * *